No. 882,448. PATENTED MAR. 17, 1908.
I. BOYD.
FILTER.
APPLICATION FILED JUNE 20, 1907.
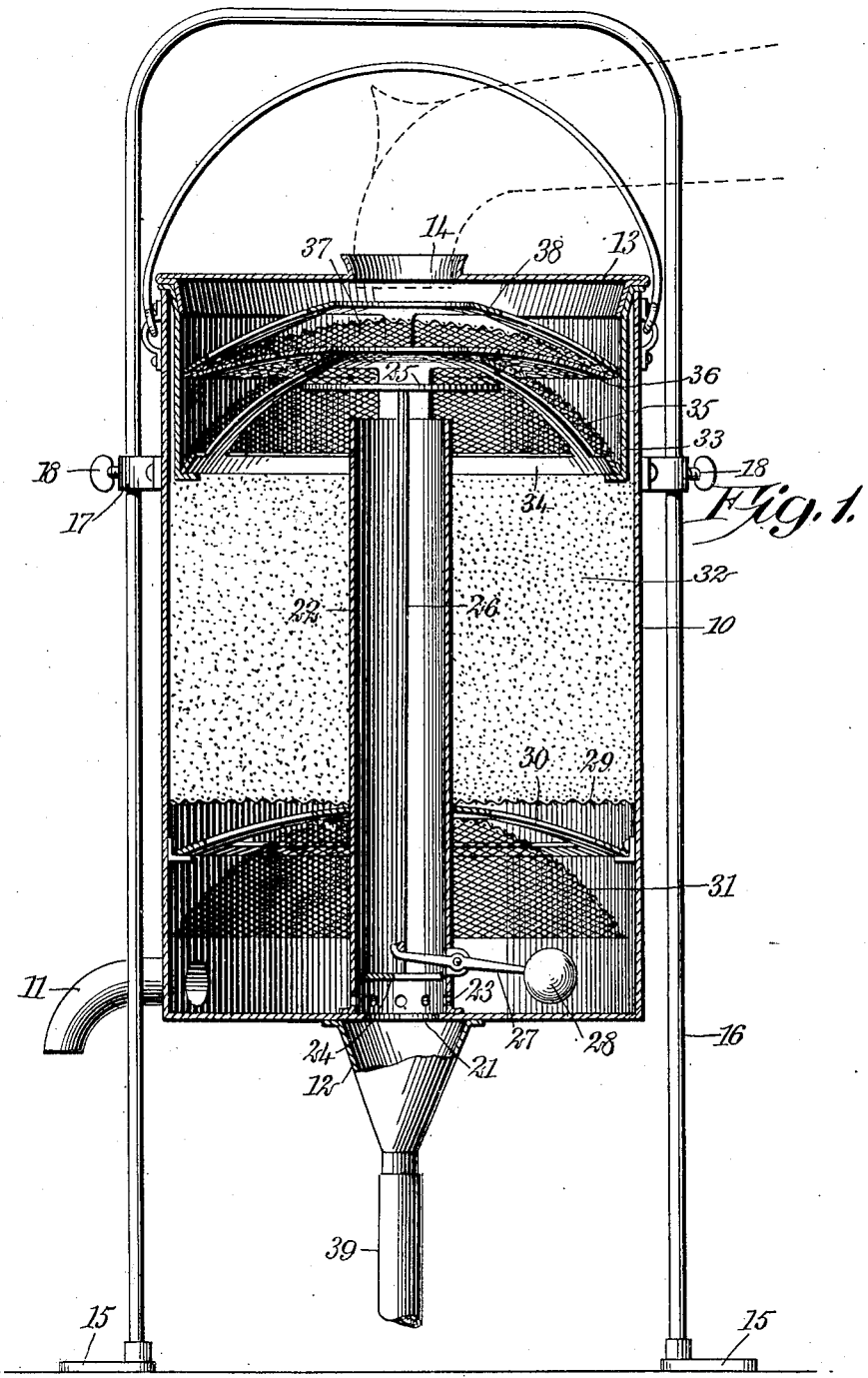
*Fig. 1.*
WITNESSES  *Fig. 2.* INVENTOR
Isham Boyd
BY Munn & Co.
ATTORNEYS

UNITED STATES PATENT OFFICE.

ISHAM BOYD, OF EMINENCE, KENTUCKY.

FILTER.

No. 882,448.   Specification of Letters Patent.   Patented March 17, 1908.

Application filed June 20, 1907. Serial No. 379,910.

*To all whom it may concern:*

Be it known that I, ISHAM BOYD, a citizen of the United States, and a resident of Eminence, in the county of Henry and State of Kentucky, have invented a new and Improved Filter, of which the following is a full, clear, and exact description.

This invention relates to certain improvements in filters, and more particularly to a filter adapted for use in connection with pumps or other general source of water supply; the object of the invention being to provide a construction whereby the filter may automatically drain and remain dry while not in use.

In my improved filter I provide a main discharge outlet, a waste outlet and means adapted to be operated by the water entering the filter for operating a valve adjacent the waste outlet, whereby so long as water is being delivered to the filter the waste outlet is substantially closed and the filtered water may drain off through the main discharge, but as soon as the supply of water to the filter is shut off, the waste outlet automatically opens to permit all of the water in the filter to escape through the drainage or waste passage.

A further object of the invention is to provide means whereby the elevation of the filter may be more readily adjusted to fit it to the different water-delivering conduits in connection with which the same may be used.

The invention consists in certain features of construction and combinations of parts, all of which will be fully set forth hereinafter and particularly pointed out in the claims.

Reference is to be had to the accompanying drawings, forming a part of this specification, in which similar characters of reference indicate coresponding parts in both the figures, and in which Figure 1 is a vertical central section through a filter constructed in accordance with my invention; and Fig. 2 is an inverted plan view of the valve plate.

In my improved filter, I employ a suitable container 10 having cylindrical walls and a flat bottom. The container is provided with a main discharge conduit 11 and a waste conduit 12 adjacent the bottom thereof, and the cover 13 is provided with a centrally-disposed opening 14 for the admission of water or other liquid to be filtered. The container is normally supported with the delivery spout extending within the opening 14, such spout being shown in dotted lines in Fig. 1, and in order to raise the container to the desired elevation to engage with the spout, I provide a support of the character illustrated. As shown, this support comprises a substantially U-shaped rod having the opposite ends thereof provided with extensions 15, whereby they may be readily secured to the floor or other suitable support, and having the substantially-parallel portions of the rod forming legs 16. The legs are a slightly greater distance apart than the diameter of the filter, and the sides of the filter are provided with clamps 17 through which the legs extend. By the use of set screws 18 coöperating with said clamps, the filter may be held at any desired elevation as will be evident from an inspection of the drawings.

The bottom of the container is provided with an opening 21, whereby the interior of the container may communicate with the waste outlet 12, and within the container and extending upward from this opening is a centrally-disposed tube 22, terminating adjacent the upper end of the container. The lower end of the tube is provided with a plurality of small openings 23, and within the tube is a valve plate 24 adapted to close the opening 21. The filtering material surrounds the tube intermediate its ends, and means are provided adjacent the upper end of the tube and extending downward therethrough to the valve plate, whereby as water is admitted to the filter, the valve 24 is closed and the escape of water through the waste outlet is substantially prevented. This means preferably includes a baffle plate 25 of considerably larger diameter than the tube and normally supported directly above the end of the tube. The plate is connected by a rod, wire, or bar 26 to the valve plate 24, and this rod is preferably forked at its lower end and connected to the valve plate at opposite sides thereof. Pivoted to the wall of the tube adjacent the lower end thereof, is a lever 27 having one end in engagement with the forked end of the rod 26, and having a suitable weight 28 upon the opposite end thereof.
The filter is preferably formed of three parts, namely, the supporting members surrounding the tube adjacent the lower end, the main body of filtering material surrounding the tube intermediate its ends, and the gauze filtering screens at the upper end which prevent the admission of foreign substances of any size to the main filtering body. The supporting members comprise a wire gauze 29 engaging with the inner walls of the container and with the outer walls of the tube and supported in any suitable manner. As illustrated, a spider 30 is employed, the outer edges of which are supported upon the inner wall of the container and the central portion of which is curved upward and engages with the central portion of the gauze 29. Beneath this spider is provided a dome-shaped gauze 31. The main filtering body 32 is preferably of charcoal and is supported directly upon the gauze 29, and extends upward to a point closely adjacent the upper end of the tube.

The upper filtering screens are preferably removable from the container and serve not only to prevent the filtering charcoal from being displaced by the force of the current of water, but also serve to remove foreign bodies. As shown, the upper filtering screens comprise an annular shield 33 having an outwardly-extending flange at its upper end resting upon the top of the container, and having an inwardly-directed flange at its lower end serving to support the screens. As shown, a dome-shaped skeleton frame 34 rests upon the last-mentioned flange and serves to support a dome-shaped gauze 35. Directly above this dome and its supporting skeleton frame is an annular plate 36 having a large centrally-disposed opening and a plurality of smaller openings adjacent the outer sides thereof. Above this plate is a gauze dome 37 of more flattened contour than the first mentioned dome and held in place by a skeleton frame 38 directly above the same. These parts are all supported one directly above the other and rest upon the inwardly-directed flange at the lower end of the annular shield or casing 33. Foreign bodies in entering with the water through the aperture 14 in the cover 13 are delivered through the outer surfaces of the several domes and the impurities are directed downward toward the outer sides, while the water passes directly through. When it is desired to clean the screens, the casing carrying said screens may be removed and this entire portion of the device taken apart.

In the operation of my improved filter, the container is adjusted to the desired height by means of the telescoping legs, and the water is delivered, as for instance, from the spout of a pump, through the opening 14. The incoming water strikes the plate 25 and the momentum lowers said plate against the action of the weight 28 until the valve plate 24 substantially closes the outlet 21. The water is thus prevented from entering the upper end of the tube, and is at the same time prevented from escaping to any material extent through the waste conduit 12. The main body of the water passes through the filtering material and escapes through the main discharge conduit 11. So long as the water continues to enter the filter the waste outlet remains closed, but as soon as the supply of water is stopped, the weight 28 acts to raise the valve plate and the water remaining in the device may then escape through the openings 23 into the tube and out through the waste outlet 12, thus permitting the filter to completely drain and the excess of water to escape back to the well or to any other desired locality.

The discharge conduit 12 is preferably funnel-shaped at its outer end, and the lower end telescopes with a conduit 39, whereby connection is formed between the conduit 12 and the conduit 39 irrespective of the elevation to which the container is raised. In order to prevent the valve plate 24 from being held in its closed position by the weight of the water above the same, I preferably so construct the valve that it does not perfectly fit the outlet passage 21, and whereby a small amount of water may escape past the valve at all times. As shown, the valve plate is provided with a radial slot 24ª, which serves to prevent the valve from sticking and normally permits of a small leakage.

Having thus described my invention, I claim as new and desire to secure by Letters Patent:

1. A filter having a centrally-disposed tube, a filtering material surrounding said tube, a main discharge outlet and a waste outlet below the filtering material, an inlet above said filtering material, a baffle plate adjacent the upper end of the tube and adapted to prevent the passage of water therethrough, a valve for controlling the waste outlet, and means connecting the baffle plate and the valve whereby the valve is closed by the momentum of the fluid impinging upon the baffle plate during the admission thereof.

2. A filter, comprising a container adapted to contain a filtering material and having an inlet opening above the filtering material and a main discharge and a waste outlet both below the same, a tube extending through said filtering material, a valve for controlling the waste outlet, and means operatively connected to said valve for preventing the passage of fluid through said tube and for closing said valve during the admission of fluid through the inlet opening.

3. A filter, comprising a container adapted to contain a filtering material and having an inlet opening above the filtering material and a main discharge and a waste outlet below the same, a tube extending through said filtering material, a valve for controlling the waste outlet, means operatively connected to said valve for preventing the passage of fluid through said tube and for closing said valve during the admission of fluid through the inlet opening, and means within said container and below said filtering material for normally holding said valve open.

4. A filter, comprising a container, an annular casing within the upper end thereof and having means adapted to engage with the walls of the container for supporting said casing and provided with an inwardly-directed flange or projection at its lower end, a plurality of dome-shaped filtering screens within said casing and supported upon said flange or projection and detachable from said casing, a cover for said container and casing and having an inlet opening above said screens, and a filtering material within said container below said screens.

5. A filter, comprising a container, an annular casing within the upper end thereof and having means adapted to engage with the walls of the container for supporting said casing and provided with an inwardly-directed flange or projection at its lower end, a plurality of dome-shaped filtering screens within said casing and supported upon said flange or projection and detachable from said casing, a cover for said container and casing and having an inlet opening above said screens, a filtering material within said container below said screens, said container being provided with an outlet below said filtering material, a valve for said outlet, and a baffle plate connected to said valve and disposed within the dome of said screens for automatically closing said valve during the admission of liquid through the inlet opening of the cover.

In testimony whereof I have signed my name to this specification in the presence of two subscribing witnesses.

ISHAM $\overset{\text{his}}{\times}$ BOYD.
mark

Witnesses:
   JNO. A. CRABB,
   H. C. DALE.